(12) United States Patent
Iizuka et al.

(10) Patent No.: US 8,730,234 B2
(45) Date of Patent: May 20, 2014

(54) IMAGE DISPLAY APPARATUS AND IMAGE DISPLAY METHOD

(75) Inventors: Yoshio Iizuka, Yokohama (JP);
Kiyohide Satoh, Kawasaki (JP);
Hidehiko Morinaga, Tokyo (JP); Akira Yoshino, Tokyo (JP); Maiko Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 13/216,348

(22) Filed: Aug. 24, 2011

(65) Prior Publication Data

US 2012/0050278 A1    Mar. 1, 2012

(30) Foreign Application Priority Data

Aug. 31, 2010 (JP) ................................. 2010-193759

(51) Int. Cl.
*G06T 15/00* (2011.01)

(52) U.S. Cl.
USPC ............................ 345/419; 382/128; 128/922

(58) Field of Classification Search
USPC ............................ 345/419; 382/128; 128/922
See application file for complete search history.

(56) References Cited

U.S. PATENT DOCUMENTS

| | | | |
|---|---|---|---|
| 5,891,030 | A | 4/1999 | Johnson et al. |
| 6,369,812 | B1 * | 4/2002 | Iyriboz et al. ................. 345/419 |
| 6,928,314 | B1 * | 8/2005 | Johnson et al. ............... 600/407 |
| 6,993,450 | B2 | 1/2006 | Takemoto et al. |
| 7,092,109 | B2 | 8/2006 | Satoh et al. |
| 7,167,180 | B1 | 1/2007 | Shibolet |
| 7,379,573 | B2 | 5/2008 | Tomoda et al. |
| 8,397,170 | B2 | 3/2013 | Araoka |
| 2002/0176614 | A1 * | 11/2002 | Kuth et al. .................... 382/128 |
| 2006/0017748 | A1 | 1/2006 | Ozawa |
| 2007/0133849 | A1 | 6/2007 | Young et al. |
| 2008/0117210 | A1 | 5/2008 | Razeto et al. |
| 2010/0142776 | A1 | 6/2010 | Johnson et al. |

FOREIGN PATENT DOCUMENTS

| | | |
|---|---|---|
| CN | 1484199 A | 3/2004 |
| CN | 1702645 A | 11/2005 |
| CN | 1722177 A | 1/2006 |
| JP | 2001-511031 A | 8/2001 |
| JP | 2002-112998 A | 4/2002 |

(Continued)

OTHER PUBLICATIONS

European Search Report dated Feb. 17, 2012 in corresponding EP application 11179243.8.

(Continued)

*Primary Examiner* — Xiao Wu
*Assistant Examiner* — Steven Elbinger
(74) *Attorney, Agent, or Firm* — Fitzpatrick, Cella, Harper & Scinto

(57) ABSTRACT

The invention provides an image display apparatus for displaying three cross sectional images for enabling efficient observation of a three-dimensional distribution of the images between a plurality of positions of interest when there are the plurality of positions of interest (abnormal shadow candidates) in three-dimensional medical image data. The apparatus determines a display switch parameter for each coordinate axis according to a positional relationship between a first position of interest and a second position of interest on a displayed image for each coordinate axis, and displays the cross sectional images by switching the cross sectional images in parallel from the first position of interest toward the second position of interest according to the determined display switch parameter.

14 Claims, 3 Drawing Sheets

(56) References Cited

FOREIGN PATENT DOCUMENTS

| JP | 2004-173910 A | 6/2004 |
| JP | 2007-511268 A | 5/2007 |
| WO | 2005/048198 A1 | 5/2005 |
| WO | 2008/089483 A2 | 7/2008 |

OTHER PUBLICATIONS

K. Ramaswamy et al., "Interactive Dynamic Navigation for Virtual Endoscopy", Computers in Biology and Medicine 29 (1999) pp. 303-331.

M. Teistler, et al., "Simplifying the Exploration of Volumetric Images: Development of a 3D User Interface for the Radiologist's Workplace", Journal of Digital Imaging, vol. 21, Supl. 1, 2008: pp. S2-S12.

M. Oda et al., "Development of a Navigation-Based CAD System for Colon", J. Duncan and G. Gerig (Eds.): MICCAI 2005, LNCS 3749, pp. 696-703, 2005.

W. Higgins, PhD, et al., "Virtual Bronchoscopy for Three-dimensional Pulmonary Image Assessment: State of the art and Future Needs", RadioGraphics May-Jun. 1998, vol. 18: pp. 761-778.

European Search Report dated Mar. 19, 2013 in corresponding EP application 11179243.8.

The State Intellectual Property Office of P.R. China, Notification of First Office Action dated May 31, 2013 in corresponding Chinese Application No. 201110258716.8.

* cited by examiner

IMAGE DISPLAY APPARATUS AND IMAGE DISPLAY METHOD

BACKGROUND OF THE INVENTION

1. Field of the Invention

The present invention relates to a technique of simultaneously displaying a plurality of cross sectional images of three-dimensional medical image data.

2. Description of the Related Art

Three-dimensional medical image data can be made into groups of cross sectional images respectively in the three orientations of cross sections called an axial cross section (cross section dividing the trunk at any height), a coronal cross section (cross section dividing the trunk into anterior and posterior halves), and a sagittal cross section (cross section dividing the trunk into right and left halves). Each group of cross sectional images consists of a plurality of cross sectional images put in each of the three orientations of cross sections. Conventional techniques are capable of simultaneously displaying the three cross sectional images by selecting an image from each group of cross sectional images and displaying the selected images in respective image display areas allocated for these images.

As a general method of making diagnoses on images by using a conventional image display apparatus, a medical doctor first scrolls the axial cross sectional image looking for an abnormal shadow (candidate). The term "scroll" here refers to a display controlling method of sequentially switching the cross sectional images to display according to a user's instruction. That is a method of displaying the cross sectional images by serially switching the images to display, where, provided that the cross sectional images included in a single group of cross sectional images are denoted by I1 to Im and the cross sectional image to display is denoted by Ii (i={1-m}), the index value i is incremented or decremented by a predetermined number (usually, one) for switching the images.

When the doctor finds one or more abnormal shadows (candidates) during the above described scrolling of the axial cross sectional image, the doctor scrolls the cross sectional images close to those showing the abnormal shadows (candidates) again to minutely observes the shadows (candidates). If the doctor feels awkward in determining the three-dimensional distribution of abnormal shadows (candidates) from only one group of cross sectional images, the doctor displays the three cross sectional images (axial cross section, coronal cross section, sagittal cross section)

Japanese Patent Application Laid-Open No. 2004-173910A discloses an approach of switching display for a single group of cross sectional images (in the embodiment, a group of axial cross sectional images). Japanese Patent Application Laid-Open No. 2004-173910A describes that the invention can improve medical diagnoses in efficiency and accuracy by providing selective display of cross sectional images which show the abnormal shadow candidates detected by the image display apparatus for the doctor who is making a diagnosis by observing the single group of cross sectional images.

Each of these conventional techniques of displaying three cross sectional images has image display areas respectively for the three cross sectional images. With these techniques, a user can scroll the cross sectional images only in a specified display area by specifying a single display area among three display areas.

SUMMARY OF THE INVENTION

With these conventional techniques of displaying three cross sectional images, however, it is difficult to efficiently observe the three-dimensional distribution of abnormal shadows (candidates) when a plurality of abnormal shadows exist. The present invention is adapted in view of the circumstances, and an object of the present invention is to provide an apparatus for solving the above-described problem.

In order to solve the problems discussed above, the present invention provides with an image display apparatus capable of displaying a plurality of cross sectional images made from three-dimensional medical image data, comprising a determining unit that determines a display switch parameter for each coordinate axis according to a positional relationship between a first position of interest and a second position of interest on a displayed image for each coordinate axis, and a displaying unit that displays the cross sectional images by switching the cross sectional images in parallel from the first position of interest toward the second position of interest according to the determined display switch parameter.

With the image display apparatus according to the present invention, display of a plurality of cross sectional images can be simultaneously switched in parallel according to a display switch parameter set for each coordinate axis. It has an advantage of enabling efficient observation of a three-dimensional distribution of a plurality of positions of interest.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Preferred embodiments of an image display apparatus and a controlling method of the same according to the present invention will be described below with reference to the appended drawings; however, the scope of the present invention is not limited to the drawings.

First Embodiment

Figure 1:
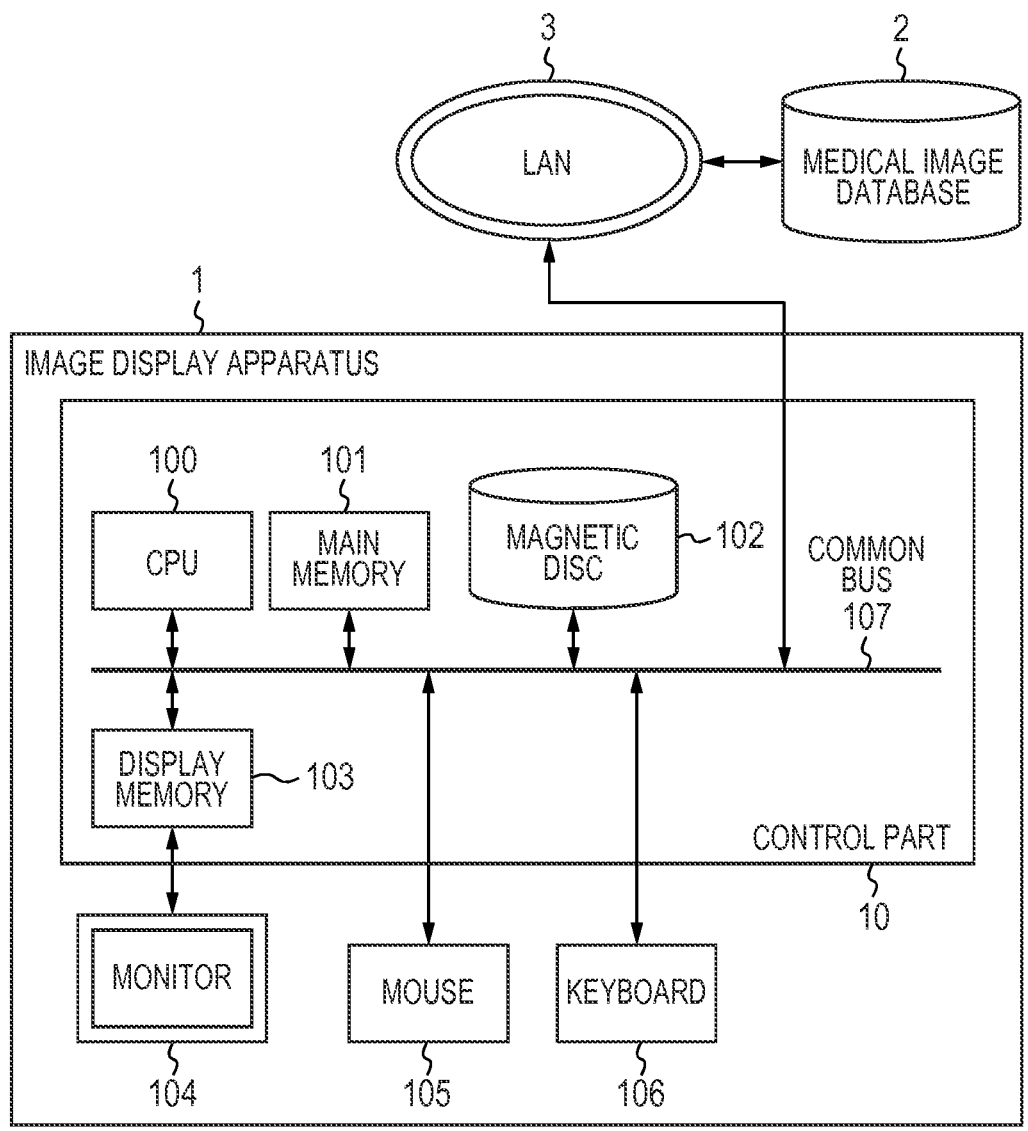
FIG. 1 is a diagram illustrating an exemplary configuration of an image display apparatus according to a first embodiment.

FIG. 1 is a diagram illustrating an exemplary configuration of an image display apparatus according to the first embodiment. The image display apparatus 1 has a control part 10, a monitor 104, a mouse 105, and a keyboard 106. The control part 10 has a central processing unit (CPU) 100, a main memory 101, a magnetic disc 102, and a display memory 103. When the CPU 100 executes a program stored in the main memory 101, various types of control such as control on the communication with a medical image database 2 and control over the image display apparatus 1 are performed.

The CPU 100 mainly controls operations of the components of the image display apparatus 1. The main memory 101 stores a control program executed by the CPU 100 and provides a workspace for the CPU 100 to execute the program. The magnetic disc 102 stores an operating system (OS), a device drive for peripheral devices, and application programs including programs for performing processes such as a diagnosis supporting process (described later). The display memory 103 temporarily stores data to be displayed on the monitor 104. The monitor 104 may be, for example, a CRT monitor or a liquid crystal monitor, and displays an image based on the data from the display memory 103. The mouse 105 and the keyboard 106 are respectively for a user (doctor) to perform pointing input and text input or the like. The above-described components are communicatively connected to each other via a common bus 107.

In the embodiment, the image display apparatus 1 is capable of reading image data out from the medical image database 2 via a LAN (Local Area Network) 3. Here, the existing PACS (Picture Archiving and Communication System) may be used as the medical image database 2.

The above-described configuration may be realized by using a general computer and peripheral devices thereof. The controlling procedure of the image display apparatus according to the present invention (to be described later with reference to FIG. 5) may be implemented as a program to be executed on a computer.

Types of the three-dimensional medical image data include an X ray CT image, an MRI image, a PET image, and a SPECT image. In general, medical images (two dimensional and three-dimensional medical image data) are archived in the medical image database 2 in the form of files (DICOM files) complying with the international communications and archive standard for medical images called the DICOM standard.

Figure 2:
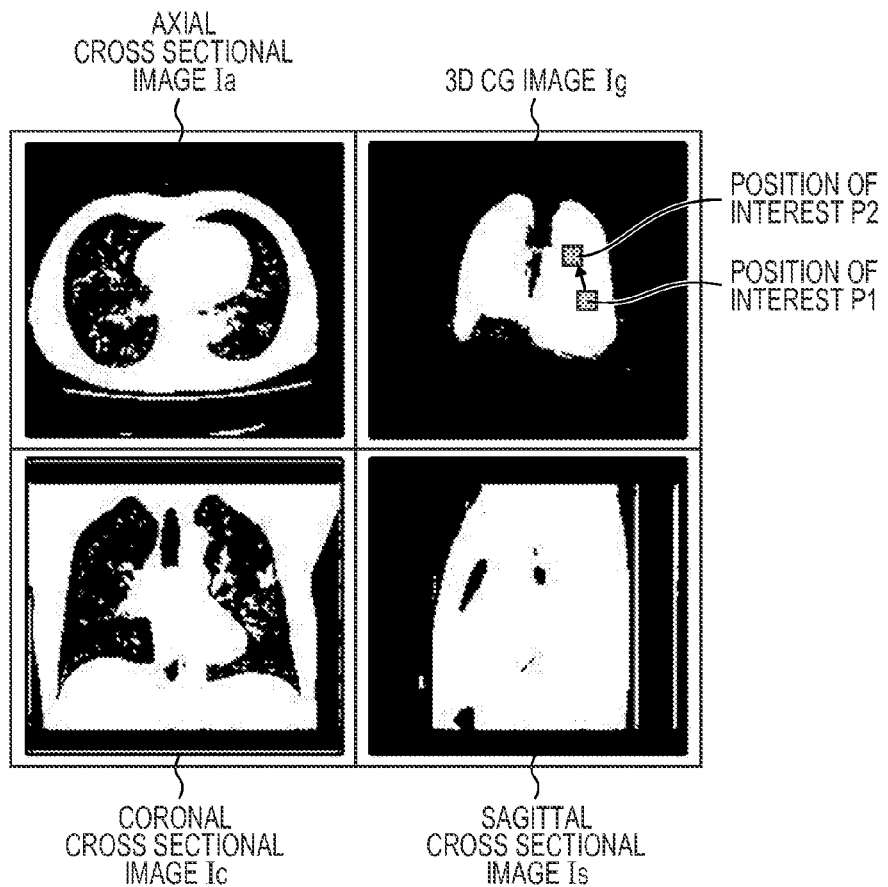
FIG. 2 is an exemplary display of three cross sectional images by the image display apparatus according to the first embodiment.

FIG. 2 is an exemplary display of three cross sectional images by the image display apparatus according to the first embodiment. In the figure, an axial cross sectional image displaying area is at the top left of the screen, a coronal cross sectional image displaying area is at the bottom left, a sagittal cross sectional image displaying area is at the bottom right, and a 3DCG (three-dimensional computer graphics) image displaying area is at the top right. An axial cross sectional image Ia, a coronal cross sectional image Ic, a sagittal cross sectional image Is, and a 3DCG image Ig are displayed in the displaying areas, respectively.

In the example shown in FIG. 2, two positions of interest, a first position of interest P1 (also referred to as "first position") and a second position of interest P2 (also referred to as "second position"), are displayed on the 3DCG image Ig. The positions of interest may be three or more. When there are three or more positions of interest, the third and later positions of interest may be treated as route positions as described later with reference to FIG. 4. Alternatively, two positions of interest may be arbitrarily picked up from the three or more positions of interest to put under control of display switching operation (to be described later).

The plurality of positions of interest P1, P2, . . . may be centers of gravity of the plurality of abnormal shadow candidates previously detected by the image display apparatus 1, or the positions of interest on the three cross sectional image previously specified by the user (positions suspected to be the location of the abnormal shadows by the user). Alternatively, the position of interest P1 may be an intersection of the currently displayed three cross sectional images. That is, the position of interest may not be necessarily the position of an abnormal shadow (candidate).

In the description below, it is assumed that the x axis of the three medical image data is set in the left to right direction of the trunk, the y axis is set to the front to back direction of the trunk, and the z axis is set to the top to bottom direction of the trunk.

Figure 3:
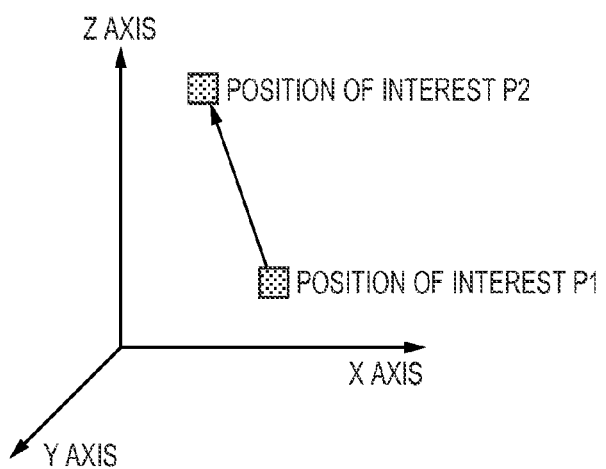
FIG. 3 is a diagram illustrating respective examples of coordinates for two positions of interest P1 and P2.
Figure 4:
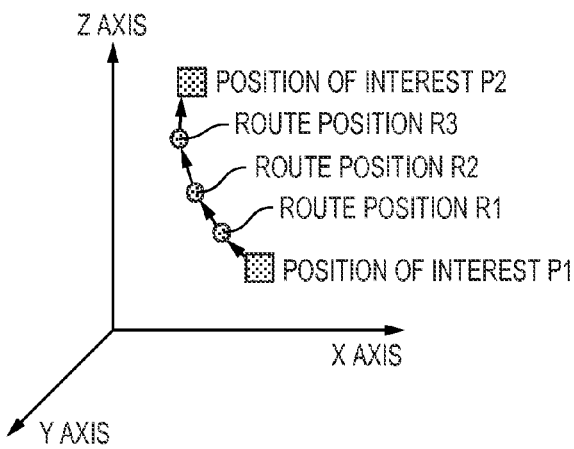
FIG. 4 is a diagram illustrating respective examples of coordinates for two positions of interest P1 and P2 and three route positions R1, R2, and R3.

FIG. 3 is a diagram illustrating respective examples of coordinates for two positions of interest P1 and P2. FIG. 4 is a diagram illustrating respective examples of coordinates for two positions of interest P1 and P2 and three route positions R1, R2, and R3. In FIG. 4, route positions R1-Rn ($n \geq 1$) may be anywhere on a route from the position of interest P1 to the position of interest P2, which may be determined by several ways as exemplified below.

As a first example of determining the route position Rn, the user previously determines two positions of interest P1 and P2, and then, those among the abnormal shadow candidates previously detected by the image display apparatus 1, the candidates at the positions other than the positions of interest P1 and P2 are determined as the route positions R1-Rn. The route from P1 to P2 may be any route that passes each of the route positions once, and generally, positions are determined as the route positions R1-Rn in the order to form the shortest route.

As a second example of determining the route position Rn, among the abnormal shadow candidates previously determined by the image display apparatus 1, the abnormal shadow candidate at the smallest coordinate z is determined as the position of interest P1, and the abnormal shadow candidate at the largest coordinate z is determined as the position of interest P2. P1 and P2 may be determined in the reverse order, or the coordinate x or the coordinate y may be referenced instead of the coordinate z. Then, the remaining abnormal shadow candidates are determined as the route positions R1-Rn in the order of proximity to P1.

As a third example of determining the route position Rn, any one of the abnormal shadow candidates detected by the image display apparatus 1 (for example, the candidate at the smallest z coordinate) is determined as the positions of interest P1 and P2, and the remaining abnormal shadow candidates are determined as the route positions R1-Rn. In this case, the route is determined to start from P1, pass the route positions R1-Rn, and return to P1(=P2).

The above-described display switching control may also be repeated until the user's instruction.

A fourth example of determining the route position Rn is a case where two positions of interest P1 and P2 are previously determined in a certain way. Any of those which cross the two positions of interest P1 and P2 among the main body parts (for example, blood vessel, bronchus) which is previously detected by the image display apparatus 1 is determined on the route starting from P1 to P2. Then, the positions which equally divide the route by a predetermined number (four in the example shown in the figure) are set as the route positions R1-Rn.

A fifth example of determining the route positions Rn is a case where the two positions of interest P1 and P2 are previously determined in a certain way. Any of those which cross the two positions of interest P1 and P2 among the main body parts (for example, blood vessel, bronchus) which is previously detected by the image display apparatus 1 is determined on the route starting from P1 to P2. Then, characteristic points (for example, a branch of blood vessel, a branch of bronchus) previously detected by the image display apparatus 1 on the route, if any, the positions of the characteristic points are determined as the route positions R1-Rn.

Figure 5:
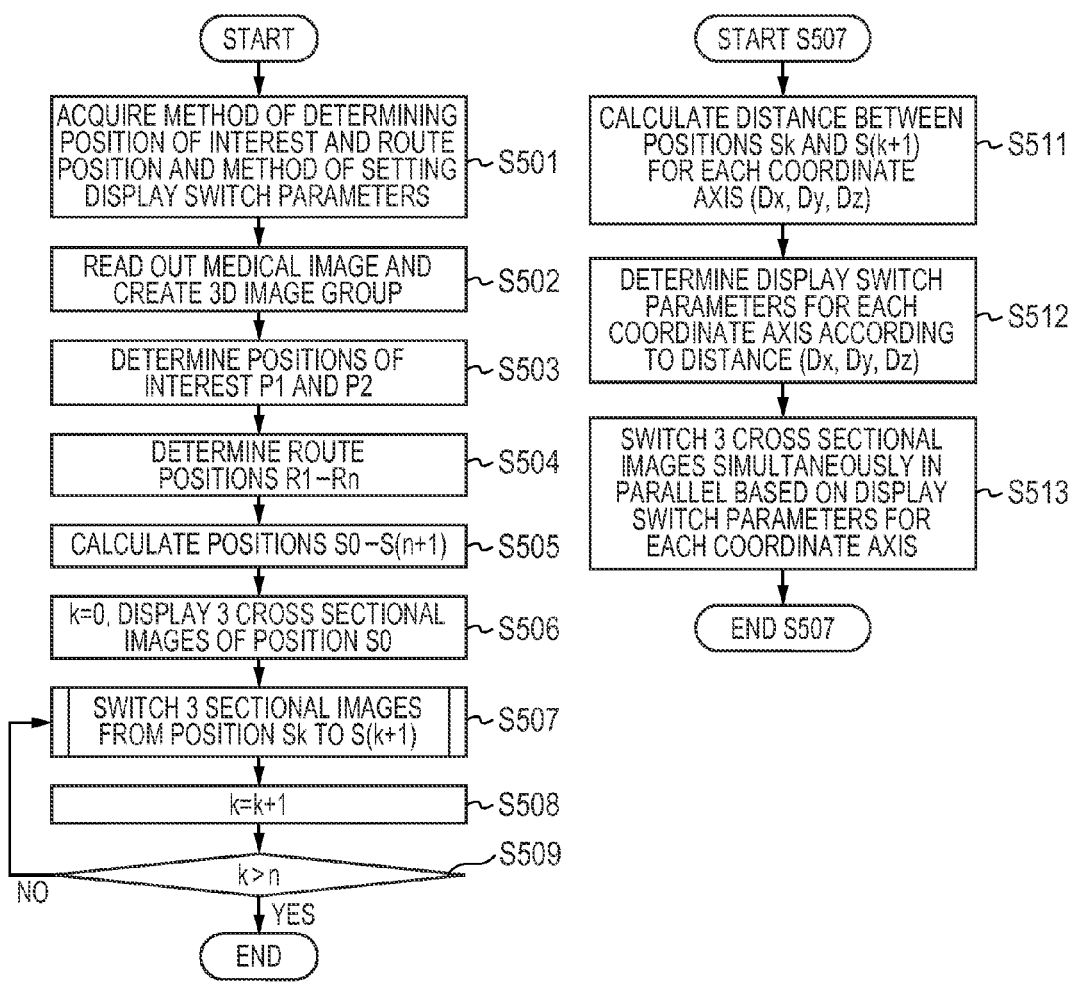
FIG. 5 is a flowchart showing a controlling procedure of the image display apparatus according to the first embodiment.

FIG. 5 is a flowchart showing a controlling procedure of the image display apparatus according to the first embodiment. In step S501, a method of determining the position of interest and the route position and a method of setting display switch parameters (to be described later) are acquired. In step S501, initial values for the method of determining the position of interest and the route position and the method of setting display switch parameters are acquired by reading out values previously stored in the magnetic disc 102 to the main memory 101. In step S501, when a user's instruction is input from the mouse 105 or the keyboard 106, the method of determining the position of interest and the route position or the method of setting display switch parameters are changed according to the instruction, and the resulting values are stored in the main memory 101.

In step S502, three-dimensional image data is read out from the medical image database 2 via the LAN 3. Further, in step S502, three groups of cross sectional images (a group of axial cross sectional images, a group of coronal cross sectional images, a group of sagittal cross sectional images) are made from the read out three-dimensional medical image data at a predetermined sampling interval (for example, by 1 mm).

In step S503, the position of interest P1 and the position of interest P2 are determined according to the method of determining the position of interest and the route position determined in step S501 in any of the ways described above with reference to FIGS. 2 to 4, and the resulting values are stored in the memory 101.

In step S504, the route positions R1-Rn are determined according to the method of determining the position of interest and the route position determined in step S501 in the way described above with reference to FIG. 4, and the resulting values are stored in the memory 101. In some methods of determining the position of interest and the route position, the route position is not specified. In that case, the processing below is performed by setting the number of the route position as n=0.

In step S505, positions S0–S(n+1) are calculated by the formulae (1) to (3). In the description below, the coordinate of the position Sk is assumed to be (xk, yk, zk).

$$S0 = P1 \quad (1)$$

$$Sj = Rj, j = 1 - n \quad (2)$$

$$S(n+1) = P2 \quad (3)$$

In step S506, 0 is substituted to the index k to the position S0–S(n+1). Further, in step S506, the three cross sectional images with the position 50 at the image center are displayed.

In step S507, the three cross sectional images are displayed as switched from the position Sk to the position S(k+1). The display switching control method performed here will be described in later steps S511-S513.

In step S508, the value 1 is added to the index k. In step S509, it is judged whether the value of the index k is larger than the value indicating the number n of the route positions, and if k is n or smaller, the process returns to step S507, whereas if k is larger than n, the process ends.

A detailed controlling procedure of step S507 will be described below as step S511 to step S513. In step S511, a distance (Dx, Dy, Dz) between the position Sk and the position S(k+1) is calculated for each coordinate axis by the formulae (4) to (6) below.

$$Dx = |x(k+1) - xk| \quad (4)$$

$$Dy = |y(k+1) - yk| \quad (5)$$

$$Dz = |z(k+1) - zk| \quad (6)$$

In step S512, the display switch parameters are determined according to the positional relationship between the position of interest P1 and the position of interest P2 for each coordinate axis, i.e., the distance (Dx, Dy, Dz) for each coordinate axis. In step S513, display switching of the three cross sectional images is performed simultaneously in parallel according to the display switch parameters for each coordinate axis. As there are a plurality of methods of setting the display switch parameters as exemplified below, the parameters are set by the method specified in step S501.

In a first example of the method of setting the display parameters, the same display switch rate is set for all the cross sectional images. Then, in proportion to the distances Dx, Dy, Dz for the coordinate axes, the display skip intervals (the number of cross sectional images to be reduced) are set for the sagittal cross sectional image, the coronal cross sectional image, and the axial cross sectional image, respectively. Specifically, the numbers of cross sectional images to be reduced are set so that display of almost the same number of cross sectional images is switched in the respective groups even if the distances Dx, Dy, Dz are different.

Specifically, as the distance on a certain coordinate axis is larger, a larger display skip interval (the number of images to be reduced) is set for the cross sectional image perpendicular to the coordinate axis. For example, a predetermined number may be previously set as the display switch number, and the number of images to be reduced may be calculated for each axial direction so that the display switch number is almost the same as the predetermined number. The number of cross sectional images between Sk and S(k+1) in the axial direction in which the distance is the smallest may be used as the reference value of the number of display switches (that is, the number of images to be reduced in this axial direction is set to 0). In that case, the numbers of images to be reduced in the other axial directions are set so that the display switch numbers are almost the same as the reference value.

As a result, the display switch can be performed for the three cross sectional images almost in sync with each other.

In a second example of the method of setting the display parameters, the same number of images to be reduced is set for all the cross sectional images. Then, in proportion to the distances Dx, Dy, Dz for the coordinate axes, the display switch rates (the frame rates, the inverse numbers of the display time period for one cross sectional image) are set for the sagittal cross sectional image, the coronal cross sectional image, the axial cross sectional image. Specifically, the display switch rates are set so that the transition time periods for the cross sectional images are almost the same even if the distances Dx, Dy, Dz are different. That is, as the distance on a certain coordinate axis is larger, a larger display switch rate (frame rate) is set for the cross sectional image perpendicular to the coordinate axis (the display time period for a cross sectional image is shortened). For example, a predetermined value may be previously set as the transition time period, and the display switch rates may be calculated and set so that the transition time periods in the axial directions are the same as the predetermined value. Alternatively, the transition time period may be set according to the distance in the direction so that the display switch rate in a predetermined direction (for example, on the axial cross section) is the predetermined value, and then the display switch rates in the other axial directions may be set based on the transition time period. Yet alternatively, the transition time period may be set according to the distance in the axial direction in which the distance is the largest, so that the display switch rate in the direction is the predetermined value, and then the display switch rates in the other directions may be set based on the transition time period. As a result, the display switch rates of the cross sectional images become faster in proportion to the distances. Accordingly, the start timing and the end timing of display switch are almost the same for all the cross sectional images even though the display switch numbers of the three cross sectional images are different.

The image display apparatus according to the present invention, here, the image display apparatus according to the first embodiment preferably has a selection part for selecting a first position and a second position on the three-dimensional image. Here, it is desirable to have a display control part for controlling the display part to serially display a plurality of cross sectional images, which are contained in the three-dimensional image, located between the first position and the second position, and formed for each of the plurality of axes, from the first position toward the second position for each of the plurality of axes. That enables the user to select a plurality of arbitrary positions so that the cross sectional images between the selected plurality of positions are to be serially displayed.

It is desirable that the image display apparatus according to the embodiment has an input part for inputting a signal to stop the serial display on the display unit. Here, it is also desirable that the display control part controls the display part to display the cross sectional images being serially displayed when the signal is input on the display part for each of the plurality of axes. That enables the user to stop the serial display at any time to display the cross sectional images effective in diagnosing.

Second Embodiment

The first example of the method of setting the display parameters is used in step S512 of the first embodiment will be discussed. Specifically, the display skip intervals for the sagittal cross sectional image, the coronal cross sectional image, and the axial cross sectional image are set in proportion to the distances Dx, Dy, Dz in each of the coordinate axes. In the second embodiment, the image display method is further determined for each of the coordinate axes at this moment. Here, examples of the image display method include the MIP (Maximum Intensity Projection) image display, the MinIP (Minimum Intensity Projection) image display, and the average image display. The MIP image, the MinIP image, and the average image are respectively created by calculating the maximum value, the minimum value and the average value for the pixel value at respective pixel position from a plurality of adjacent cross sectional images.

In the above example, determining the image display method for each of the coordinate axes refers to determining which of the MIP image, the MinIP image, and the average image is to be displayed and determining the number of the adjacent cross sectional images to be used for creating respective images.

Specifically, as an additional process in step S512, any one of the MIP image, the MinIP image, and the average image is created by using the adjacent cross sectional images by the number equal to or proportional to the display skip intervals of the cross sectional images.

Then in step S513, display switch is performed on the three cross sectional images simultaneously in parallel by using the image created for each cross section and according to the display switch parameter for each coordinate axis. That enables application of different image display method to each cross sectional images, thereby fulfilling flexibly the users' needs.

As described above, the image display apparatus according to the present invention enables a plurality of cross sectional images to be displayed by switching them simultaneously in parallel according to the display switch parameters set for each coordinate axis. That has an advantage in enabling the user to efficiently observe the three-dimensional distribution of the images between a plurality of positions of interest (for example, abnormal shadow candidates).

Other Embodiment

The present invention is also implemented by performing the processes below. That is, the processes of supplying software programs for realizing the functions of the above-described embodiments via the network or various storage media to the system or the apparatus and for the computer (or CPU or MPU) of the system or the apparatus to read out and execute the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-193759, filed Aug. 31, 2010, which is hereby incorporated by reference herein in its entirety.

What is claimed is:

1. An image display apparatus capable of displaying a plurality of cross sectional images made from three-dimensional medical image data, comprising:
    a selecting unit configured to select a first position of interest and a second position of interest in a three-dimensional image;
    a determining unit configured to determine display switch parameters, for controlling display switching of a number of cross sectional images, by setting a transition time according to a distance between the selected first position of interest and the selected second position of interest in the three-dimensional image in one of three axial directions in which the distance is the largest such that the display switch parameter in the one axial direction becomes equal to a predetermined value, and by setting the display switch parameters in the other axial directions based on the set transition time; and
    a displaying unit configured to display the cross sectional images by switching the cross sectional images in parallel from the selected first position of interest toward the selected second position of interest according to the display switch parameters determined by the determining unit.

2. The image display apparatus according to claim 1, wherein the display switch parameters include at least one of an interval between the cross sectional images to be switched and a display switch rate of the cross sectional images.

3. The image display apparatus according to claim 2, wherein the interval between the cross sectional images is set according to a distance between the selected first position of interest and the selected second position of interest.

4. The image display apparatus according to claim 3, wherein the interval between the cross sectional images is set larger as the distance between the selected first position of interest and the selected second position of interest becomes larger.

5. The image display apparatus according to claim 2, wherein the display switch rate of the cross sectional images is set in proportion to a distance between the selected first position of interest and the selected second position of interest.

6. The image display apparatus according to claim 5, wherein the interval between the cross sectional images is set larger as the distance between the selected first position of interest and the selected second position of interest becomes larger.

7. The image display apparatus according to claim 1, wherein the display switch parameters are determined so that display by switching the cross sectional images by the displaying unit finishes at the same time for all the cross sectional images.

8. The image display apparatus according to claim 1, further comprising a controlling unit configured to perform display switching control so that one or more route positions are displayed in order wherein the route positions are determined by a predetermined method.

9. The image display apparatus according to claim 1, wherein the displaying unit displays different images for each cross sectional image.

10. The image display apparatus according to claim 1, wherein the display switch parameters are changed based on a distance between the first position of interest and the second position of interest.

11. An image display method carried out in an image display apparatus capable of displaying a plurality of cross sectional images made from three-dimensional medical image data, comprising:
  selecting a first position of interest and a second position of interest in a three-dimensional image;
  determining display switch parameters, for controlling display switching of cross sectional images, by setting a transition time according to a distance between the selected first position of interest and the selected second position of interest in the three-dimensional image in one of three axial directions in which the distance is the largest such that the display switch parameter in the one axial direction becomes equal to a predetermined value, and by setting the display switch parameters in the other axial directions based on the set transition time; and
  displaying the cross sectional images by switching the cross sectional images in parallel from the selected first position of interest toward the selected second position of interest according to the determined display switch parameters.

12. A non-transitory computer-readable storage medium storing a computer program that causes a computer to execute the method according to claim 6.

13. An image display apparatus capable of displaying a plurality of cross sectional images made from three-dimensional medical image data, comprising:
  a selecting unit configured to select a first position of interest and a second position of interest in a three-dimensional image;
  a determining unit configured to determine display switch parameters, for controlling display switching of a number of cross sectional images, by setting a transition time according to a distance between the selected first position of interest and the selected second position of interest in the three-dimensional image in one of three axial directions such that the display switch parameter in the one axial direction becomes equal to a predetermined value, and by setting the display switch parameters in the other axial directions based on the set transition time; and
  a displaying unit configured to display the cross sectional images by switching the cross sectional images in parallel from the selected first position of interest toward the selected second position of interest according to the display switch parameters determined by the determining unit.

14. An image display method carried out in an image display apparatus capable of displaying a plurality of cross sectional images made from three-dimensional medical image data, comprising:
  selecting a first position of interest and a second position of interest in a three-dimensional image;
  determining display switch parameters, for controlling display switching of cross sectional images, by setting a transition time according to a distance between the selected first position of interest and the selected second position of interest in the three-dimensional image in one of three axial directions such that the display switch parameter in the one axial direction becomes equal to a predetermined value, and by setting the display switch parameters in the other axial directions based on the set transition time; and
  displaying the cross sectional images by switching the cross sectional images in parallel from the selected first position of interest toward the selected second position of interest according to the determined display switch parameters.

* * * * *